No. 850,791. PATENTED APR. 16, 1907.
P. SCHAFER, Jr.
WATER GAP.
APPLICATION FILED APR. 30, 1906.

2 SHEETS—SHEET 1.

Witnesses
Inventor
P. Schafer Jr.
By
Attorneys

No. 850,791. PATENTED APR. 16, 1907.
P. SCHAFER, Jr.
WATER GAP.
APPLICATION FILED APR. 30, 1906.
2 SHEETS—SHEET 2.
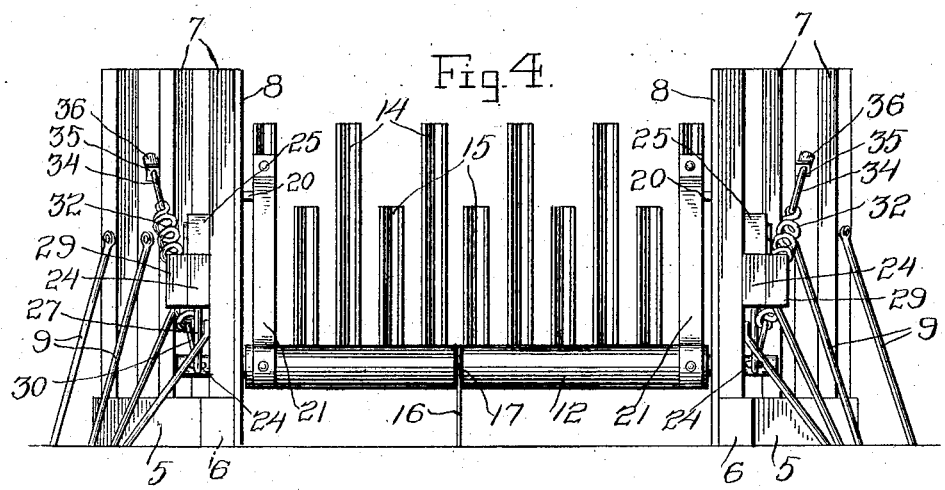
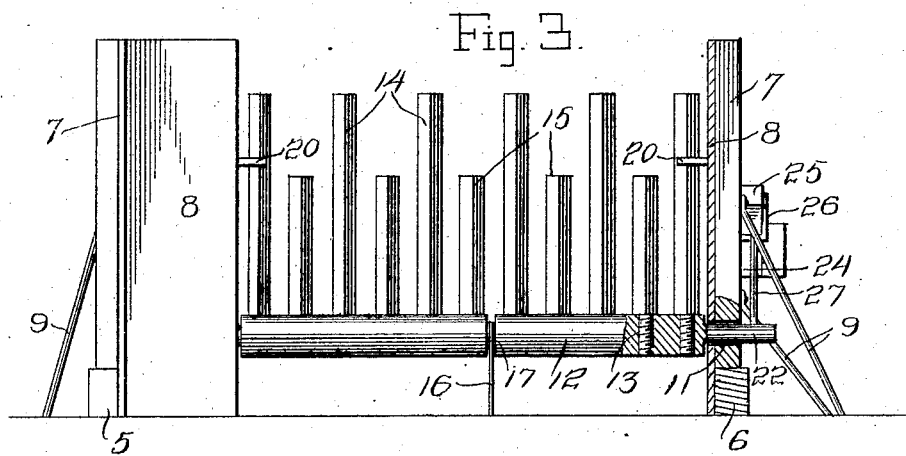
Witnesses
Inventor
P. Schafer Jr.
By Chandler & Chandler
Attorneys.

UNITED STATES PATENT OFFICE.

PETER SCHAFER, JR., OF FAIRVIEW, ILLINOIS.

WATER-GAP.

No. 850,791.　　　　Specification of Letters Patent.　　　　Patented April 16, 1907.

Application filed April 30, 1906. Serial No. 314,556.

*To all whom it may concern:*

Be it known that I, PETER SCHAFER, Jr., a citizen of the United States, residing at Fairview, in the county of Fulton, State of Illinois, have invented certain new and useful Improvements in Water-Gaps; and I do hereby declare the following to be a full, clear, and exact description of the invention, such as will enable others skilled in the art to which it appertains to make and use the same.

This invention relates to water-gaps, and has for its object to provide a gate of such construction that it will be automatically swung out of vertical position for the passage of logs through the gap, but will be swung to its original position after the log has passed through the gap.

A further object of the invention is to provide a novel but simple means for returning the gate to its original position after the said passage of the logs through the gap.

With the above and other objects in view the present invention consists in the construction and arrangement of parts shown in the accompanying drawings, in which—

Figure 1:
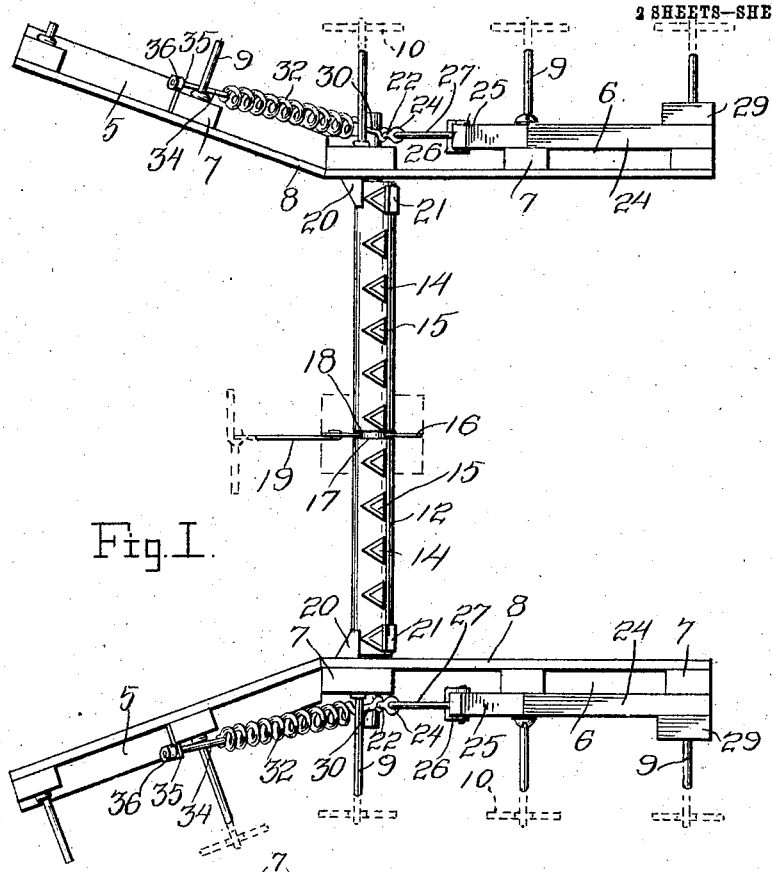
Figure 2:
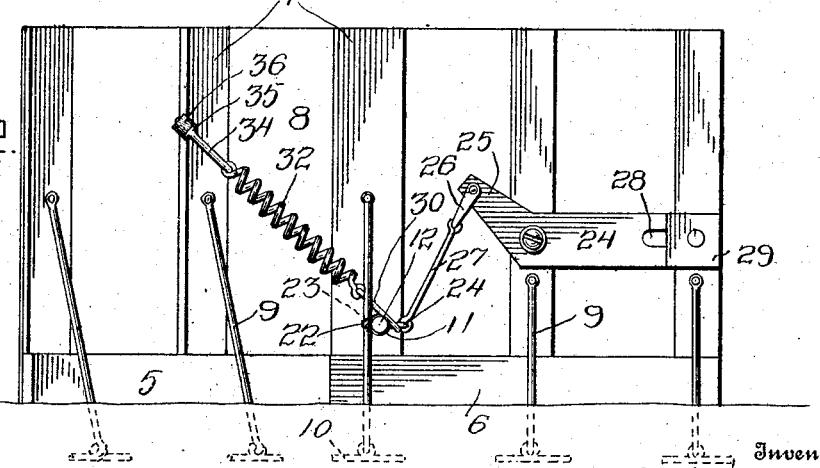

Figure 1 is a top plan view of the invention. Fig. 2 is a side elevation thereof. Fig. 3 is an end view, partly in section. Fig. 4 is a similar view taken upon the opposite end of the gap.

Referring more specifically to the drawings, the numeral 5 denotes a pair of sills which are embedded in the bed of the stream and converge forwardly and are connected at their forward ends with the corresponding beams 6 of another pair, the last-named beams being located in parallel relation with respect to each other, as shown in Fig. 2. Secured at their lower ends to the beams 5 and 6 of each pair and extending upwardly therefrom are posts 7, to which are connected sides 8 of the gap, it being understood that the opposing portions of the sides 8, which are connected with the posts carried by the beams 5, converge and that the remainder of the said sides are in mutual parallel relation.

The posts 7 are held in proper position by means of guy-rods 9, which are connected at their upper ends to the posts and are provided at their lower ends with anchors 10, which are embedded in the ground.

Mounted at its ends in suitable brackets 11, carried by the central one of each of the series of posts 7 and at a point slightly in advance of the point at which the sides 8 cease to converge, is a rock-shaft 12. The rock-shaft 12 is provided at intervals throughout its length with a series of apertures 13, through which are engaged the lower screw-threaded reduced ends of major and minor arms 14 and 15, which, together with the said rock-shaft 12, form the gate of the gap. Each of the arms 14 and 15 is hollow and triangular in cross-section and is disposed upon the rock-shaft in such a manner that they will have their sharp edges presented in an opposite direction to the direction of flow of the current of the stream.

The numeral 16 denotes a center brace for the shaft 12 and is designed for use in case the stream is a wide one and some means is found to be necessary to support the shaft at its middle. In this case the shaft is grooved annularly, as at 17, and rests upon the upper edge of the center brace 16, the said upper edge of the said brace being recessed, as at 18, for the reception of the shaft and the said brace being held in proper position by means of guy-rods 19, which are anchored in the bed of the stream.

The gate is free to swing downwardly and upwardly in the direction in which the stream normally flows, but is prevented from swinging in an opposite direction by means of detents 20, which are secured at corresponding points upon the opposing faces of the sides 8 and against which the end ones of the arms 14 normally abut to prevent the said swinging movement. As these arms are by reason of this contact with the detents subject to considerable strain, I provide a brace for each of the said arms, which comprises a strip of metal 21, secured at its upper end to its respective arm in a plane slightly above the plane occupied by the corresponding detent and extending downwardly along the forward face of the respective arms and partly around the adjacent portion of the rock-shaft 12, the said strips being secured at their lower ends to the said rock-shaft.

Engaged through openings in the ends of the rock-shaft 12 are bolts 22, which are provided at one of their ends with screw-threads for the engagement upon the bolt of an adjusting-nut 23 and at their opposite ends with eyes 24. Pivoted to one of the posts 7 upon each side of the gap are lever-arms 24, which have their rear ends turned upwardly, as at 25, and provided with clips 26, with which and the apertured end of bolts 21 are connecting-arms 27, it being understood that by this connection the shaft 12 is rocked. The lever-arms 24 will also be rocked upon their pivots. The forward arms of the lever-arms 24 are bifurcated, as at 28, and slidably engaged in the bifurcations of each arm is the shank of a weight 29, which is sufficiently heavy to return the gate to its original position after it has been rocked by the logs.

Engaged at its lower end with each bolt 21 is an arm 30, which extends upwardly and rearwardly from the said bolt 21 and is connected at its upper end with one end of a helical spring 32, which has its opposite end connected with an eye formed on the lower end of a threaded rod 34. The said rods are engaged through openings formed in brackets 35, which are secured to corresponding ones of the posts 7 upon opposite sides of the water-gap and are provided upon their ends with adjusting-nuts 36, which bear against the said brackets and serve as a means for adjusting the tension of the springs 32.

It will be readily understood from the foregoing that the weights upon the lever-arms 24 may be adjusted to suit varying conditions, as may also the tension of the spring 32 in the manner just stated, and that the spring not only aids the lever-arms in returning the gate to its normal position, but also serves to impart to the same a quick positive return movement.

What is claimed is—

1. A water-gap comprising a frame, a gate comprising a rock-shaft mounted in the frame and a plurality of pickets carried by the rock-shaft, a weighted lever-arm mounted for rocking movement upon the frame, a yoke member hingedly connected with the arm, a link connecting the yoke member and the rock-shaft, and a spring connected at one of its ends with the rock-shaft and adjustably connected at its other end to the frame.

2. A water-gap comprising a frame, a shaft mounted for rocking movement in the frame, a gate carried by the shaft, a weighted lever-arm mounted upon the frame, a crank-arm carried by the shaft, connections between said crank-arm and said lever-arm, and a spring connected with said crank-arm and adjustably connected with said frame.

In testimony whereof I affix my signature in presence of two witnesses.

PETER SCHAFER, Jr.

Witnesses:
J. H. SUYDAM,
TYSON C. SWARTZ.